(12) United States Patent
Boggess

(10) Patent No.: US 10,053,170 B2
(45) Date of Patent: Aug. 21, 2018

(54) TRAILER SYSTEM

(71) Applicant: Bary Sanford Boggess, North Ogden, UT (US)

(72) Inventor: Bary Sanford Boggess, North Ogden, UT (US)

( * ) Notice: Subject to any disclaimer, the term of this patent is extended or adjusted under 35 U.S.C. 154(b) by 304 days.

(21) Appl. No.: 15/169,332

(22) Filed: May 31, 2016

(65) Prior Publication Data

US 2016/0347389 A1    Dec. 1, 2016

Related U.S. Application Data

(60) Provisional application No. 62/168,859, filed on May 31, 2015, provisional application No. 62/168,860, filed on May 31, 2015, provisional application No. 62/239,925, filed on Oct. 11, 2015.

(51) Int. Cl.
| | |
|---|---|
| *B60P 3/07* | (2006.01) |
| *B62D 63/06* | (2006.01) |
| *B60P 3/12* | (2006.01) |
| *B62K 27/00* | (2006.01) |

(52) U.S. Cl.
CPC ............. *B62D 63/061* (2013.01); *B60P 3/07* (2013.01); *B60P 3/122* (2013.01); *B62D 63/062* (2013.01); *B62K 27/006* (2013.01)

(58) Field of Classification Search
CPC .. B62D 63/067; B62D 63/061; B62D 63/062; B60D 2001/546; Y10T 403/64; Y10T 403/642; Y10T 403/645; B62K 27/006; A01M 31/006; B62B 2202/42; B60P 3/07; B60P 3/122

USPC .......................................................... 280/78
See application file for complete search history.

(56) References Cited

U.S. PATENT DOCUMENTS

| | | | | |
|---|---|---|---|---|
| 2,988,382 | A | 6/1961 | Holland | |
| 4,078,821 | A | 3/1978 | Kitterman | |
| D281,312 | S | 11/1985 | Russell | |
| 5,098,113 | A * | 3/1992 | Albitre | B62K 27/006 280/204 |
| 5,368,325 | A | 11/1994 | Hazen | |
| 5,427,396 | A * | 6/1995 | Gore | B62D 63/067 224/320 |
| 5,984,342 | A * | 11/1999 | Ysker | B62K 27/006 280/475 |
| 6,042,138 | A | 3/2000 | Shreck | |
| D523,779 | S | 6/2006 | Mattila | |
| 7,387,308 | B2 | 6/2008 | Williamson | |
| 7,744,111 | B2 | 6/2010 | Anderson | |
| 7,850,185 | B2 * | 12/2010 | Weng | B62K 27/006 224/400 |
| 8,602,437 | B1 | 12/2013 | Morris | |
| 8,636,094 | B1 * | 1/2014 | Conner | B62K 27/006 180/204 |
| 9,016,709 | B1 * | 4/2015 | McMunn | B62D 13/025 280/444 |

(Continued)

*Primary Examiner* — Mark C Hageman
(74) *Attorney, Agent, or Firm* — Workman Nydgegger

(57) ABSTRACT

A trailer system includes a chassis defining an axis and having a first section and a second section removably attached to the first section. A wheel assembly is attached to the first section that includes a single wheel and a lift mechanism arranged to raise and lower the chassis relative to the single wheel. A twist compensation mechanism is attached to the chassis and arranged to rotate at least one of the first section and second section about the axis.

20 Claims, 13 Drawing Sheets

(56) References Cited

U.S. PATENT DOCUMENTS

2006/0175799 A1* 8/2006 Heynssens ............ B60D 1/465
                                                          1/465

* cited by examiner

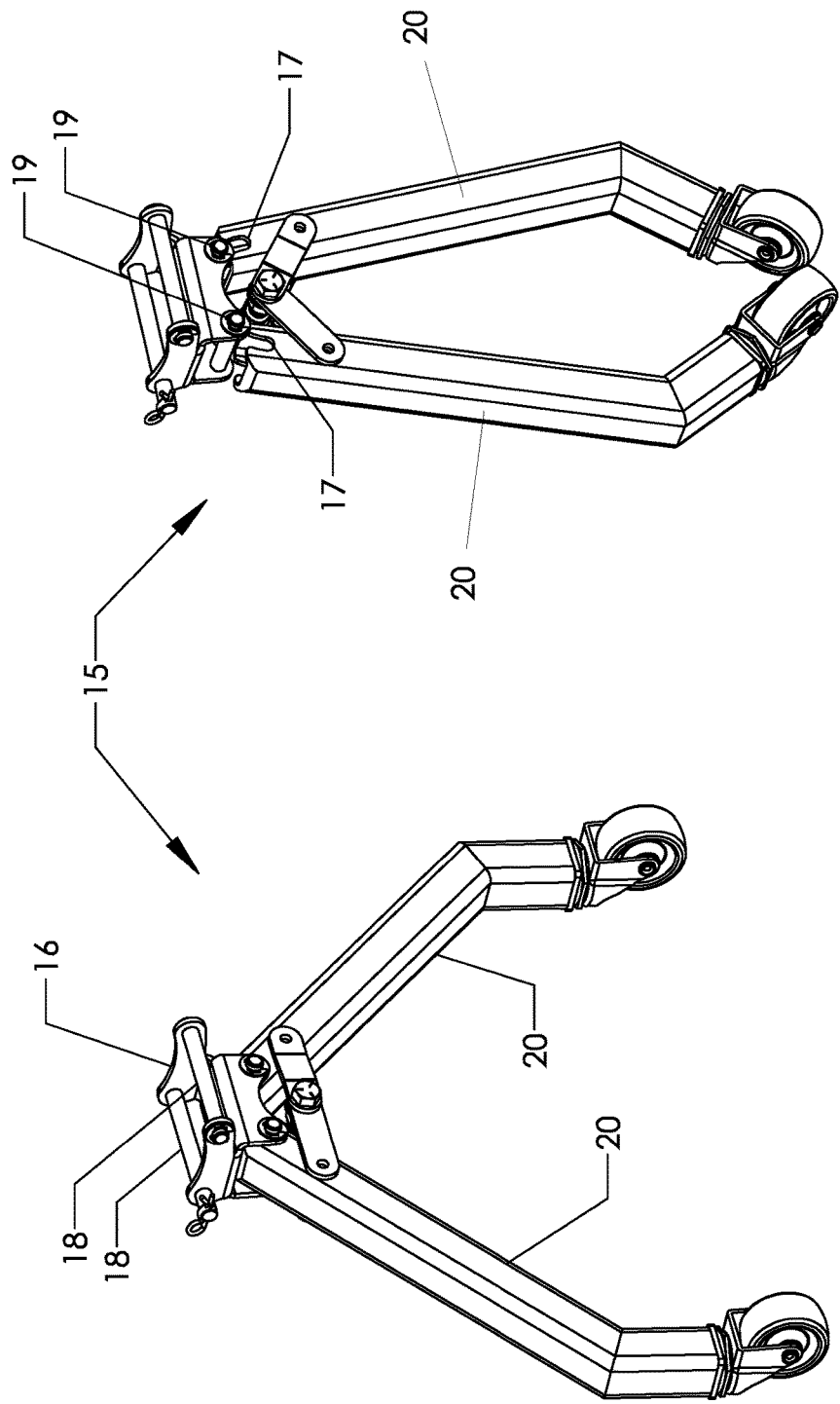

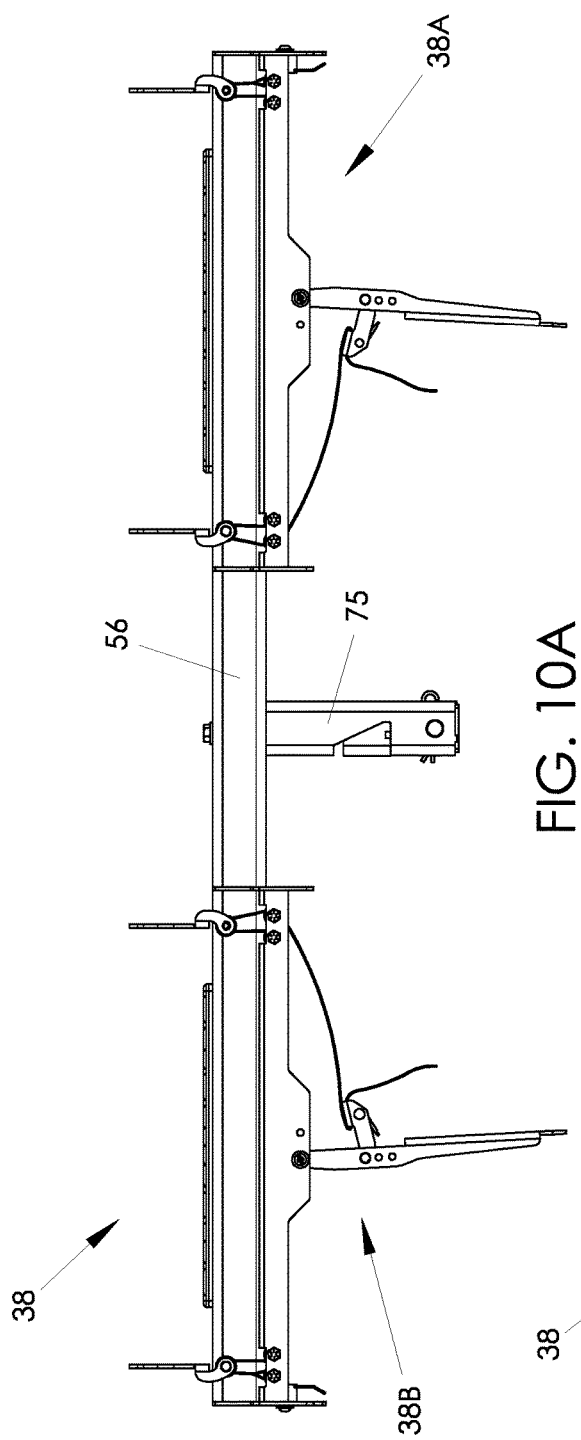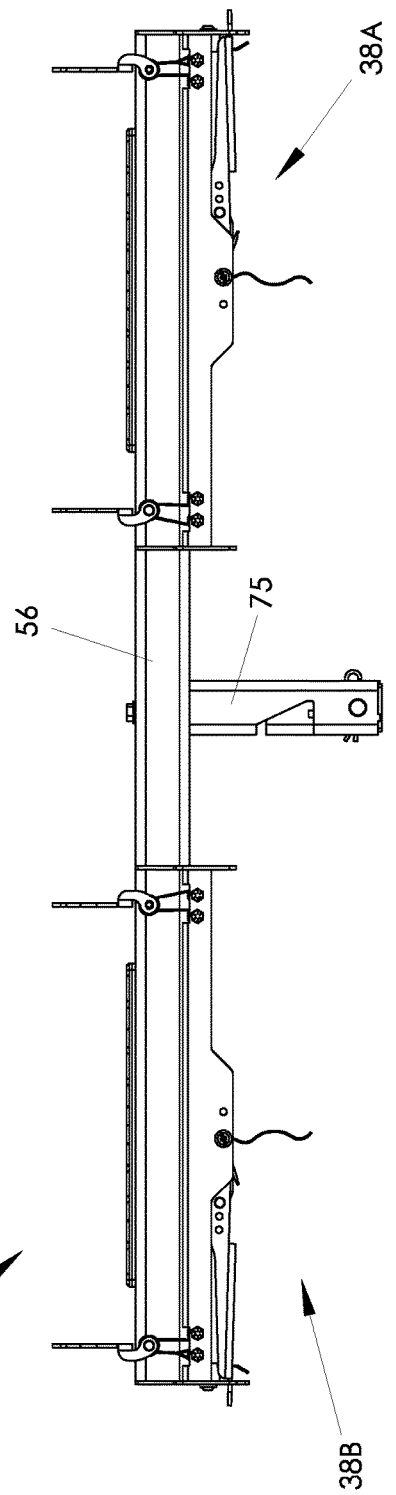

TRAILER SYSTEM

TECHNICAL FIELD

The disclosure relates to the field of trailer systems, and more particularly to a configurable minimalist trailer system.

BACKGROUND

Utility trailers are very useful for increasing the cargo carrying capacity of a vehicle or for transporting items that may be impractical or undesirable to carry in or on a vehicle. Trailers fill a need but they there are some significant disadvantages to the typical utility trailer. For instance, a typical utility trailer has a flat deck on a rectangular metal frame with some railings or walls around the perimeter to contain a load. A flat deck however is unsuitable for many types of cargo such as, for example, kayaks, bicycles and motorcycles. In addition, the flat deck with side rails or walls can add unnecessary weight and wind drag, resulting in decreased power and fuel economy for the towing vehicle.

Furthermore, conventional utility trailers are commonly infrequently used and spend most of the time taking up valuable space in a driveway or yard while decreasing the aesthetics value of a property as they succumb to the weather and turn to rust.

There is thus a need for a trailer system that can be easily reconfigured for a variety of different types of loads or cargo. There is also a call for a trailer system that can be stored using less space. It is also desirable for trailer systems that are easy to load and unload while being lightweight and streamlined.

SUMMARY

Embodiments of the trailer system are versatile, easy to store, reconfigurable and easier to load and unload. According to an embodiment, the trailer system includes a chassis defining an axis and having a first section and a second section removably attached to the first section. A wheel assembly is attached to the first section that includes a single wheel and a lift mechanism arranged to raise and lower the chassis relative to the single wheel. A twist compensation mechanism is attached to the chassis and arranged to rotate at least one of the first section and second section about the axis to compensate against torsional twist in the chassis. According to a variation, the twist compensation mechanism compensates against the torsional twist in the chassis by rotating the first section in the opposite direction of a moment about the axis generated by an unbalanced load carried by the trailer system.

According to a variation, the trailer system can include one or more accessory attachments that can be easily and selectively added to and/or removed from the chassis to reconfigure the trailer system for different applications. For example, front and back motorcycle carrier attachments can be attached to the chassis and/or replaced with a kayak carrier attachment or bicycle carrier attachment to reconfigure the trailer system for different activities and/or uses.

According to a variation, the lift mechanism is arranged to move the trailer system between a towing configuration in which the chassis is elevated a distance above a support surface (e.g., the ground, a floor surface, etc.) below the trailer system and extends generally parallel to the support surface, and storage configuration in which the chassis is positioned on the support surface and the single wheel is elevated a distance above the support surface. In another embodiment, the lift mechanism can move the trailer system into a loading configuration in which the single wheel is positioned on a support surface under the trailer system and the chassis is angled relative to the support surface, making the trailer system safer and easier to load.

BRIEF DESCRIPTION OF THE DRAWINGS

These and other features, aspects, and advantages of the present disclosure will become better understood regarding the following description, appended claims, and accompanying drawings.

FIG. 9A shows a side isometric view of the landing assembly in FIG. 1 removed from the trailer system in a first configuration.

FIG. 9B shows a side isometric view of the landing assembly in FIG. 1 removed from the trailer system in a second configuration.

FIG. 10A shows a side view of the securing system in FIG. 1 in a first configuration.

FIG. 10B shows a side view of the securing system in FIG. 1 in a second configuration.

DETAILED DESCRIPTION OF THE DISCLOSURE

It will be understood that, unless a term is expressly defined in this disclosure to possess a described meaning, there is no intent to limit the meaning of such term, either expressly or indirectly, beyond its plain or ordinary meaning.

Any element in a claim that does not explicitly state "means for" performing a specified function, or "step for" performing a specific function, is not to be interpreted as a "means" or "step" clause as specified in 35 U.S.C. § 112, paragraph 6.

Embodiments of the present disclosure include a configurable minimalist trailer system that rolls on a single wheel and is versatile, light weight, and compact. The trailer system can also be height adjustable and configured for numerous specific applications. The trailer can be configured for storage so that it takes up minimal space, making storage indoors practical. And as a single wheel minimalist trailer there is significantly less towing weight and rolling drag, resulting in better fuel economy.

Figure 1:
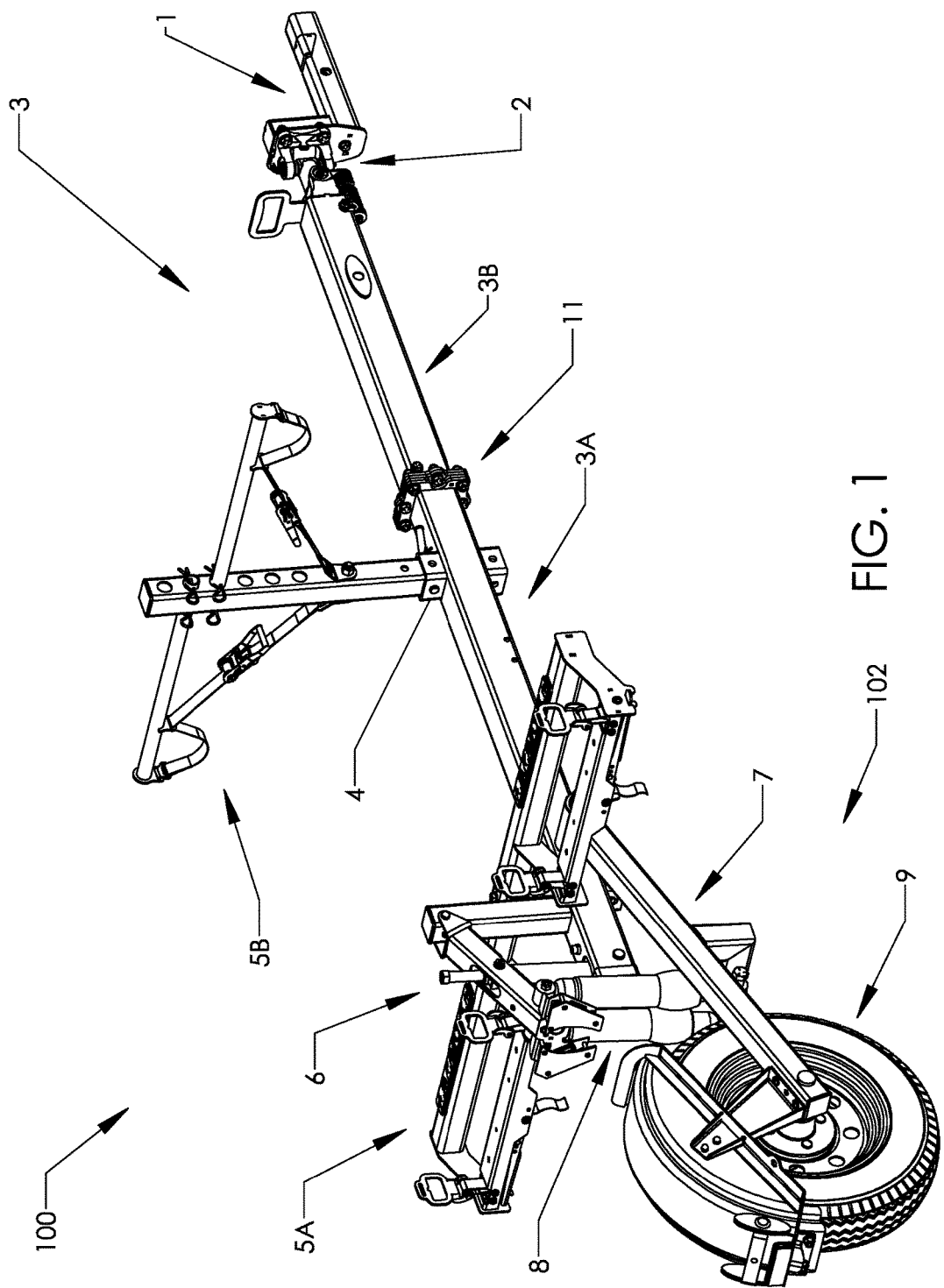
FIG. 1 shows a side isometric view of a trailer system according to an embodiment.

FIGS. 1-12 show a trailer system 100 according to an embodiment. As seen in FIG. 1, the system 100 can include a hitch component 1, a towing assembly 2, and a chassis 3. The hitch component 1 can be inserted into the hitch receiver of a towing vehicle. The hitch component 1 can include a mechanism that expands inside the hitch receiver to achieve a tight fit and rigid connection with the towing vehicle. The trailer system 100 can be arranged to rely on the towing vehicle for stability, as having one wheel it is inherently unstable.

The towing assembly 2 can be attached to a front portion of the second section 3B. The towing assembly 2 includes an offset dual articulation joint described in more detail below. This advantageously helps the trailer system 100 to stay upright while still being able to trail behind the towing vehicle and generally conform to contours of driving surfaces. It allows for pitch and yaw of the trailer relative to the towing vehicle but not roll.

As seen in FIG. 1, the chassis 3 can comprise one or more tube members defining a longitudinal axis 101 (shown in FIGS. 7 and 12a) of the trailer system 100. In an embodiment, the chassis 3 can include a plurality of sections. For instance, the chassis 3 can include at least a first section 3A and a second section 3B. According to a variation, the sections 3A, 3B are arranged to be removably attached to one another at a flanged joint 11 or other type of connection. The chassis 3 having a segmented configuration beneficially allows for a more compact storage of the trailer system 100, the addition of different extensions to vary the length of the chassis 3, and/or the insertion of other optional accessories such as a twist compensation mechanism into the system 100 as described below. The chassis 3 is shown having a generally tubular rectangular cross section but may exhibit any suitable configuration.

According to a variation, the chassis 3 can include one or more attachment features 4. The one or more attachment features 4 can comprise one or more receiver tubes 4. One or more different accessory attachments may be received and secured within the receiver tubes 4 to configure the trailer system 100 for different applications. For instance, motorcycle carrier attachments 5A and 5B can be removably secured in one or more of the receiver tubes 4, allowing the trailer system 100 to transport one or more motorcycles in a low profile manner. The motorcycle carrier attachment 5A can comprise a back motorcycle carrier attachment and the motorcycle carrier attachment 5B can comprise a front motorcycle carrier attachment. It will be appreciated that in other embodiments at least one of the motorcycle carrier attachments 5A, 5B can be permanently secured to the chassis 3.

A lift mechanism 6 is operably connected to the chassis 3 for raising and lowering the trailer system 100 relative to a wheel of the system described below. For instance, the lift mechanism 6 can be operable to lower the trailer system 100 for ease of loading and then raise the trailer system 100 for travel or for adjustment of the travel height.

The chassis 3 can be suspended on a wheel assembly 102 attached to a back portion of the first section 3A. The wheel assembly 102 can have a suspension system including a swing arm suspension assembly 7 which is dampened by shock absorbers 8 and is arranged to roll on a single wheel 9. In an embodiment, the single wheel 9 can be oversized, allowing the wheel assembly 102 to be used in muddy, snowy, and/or off-road terrain.

Figure 2:
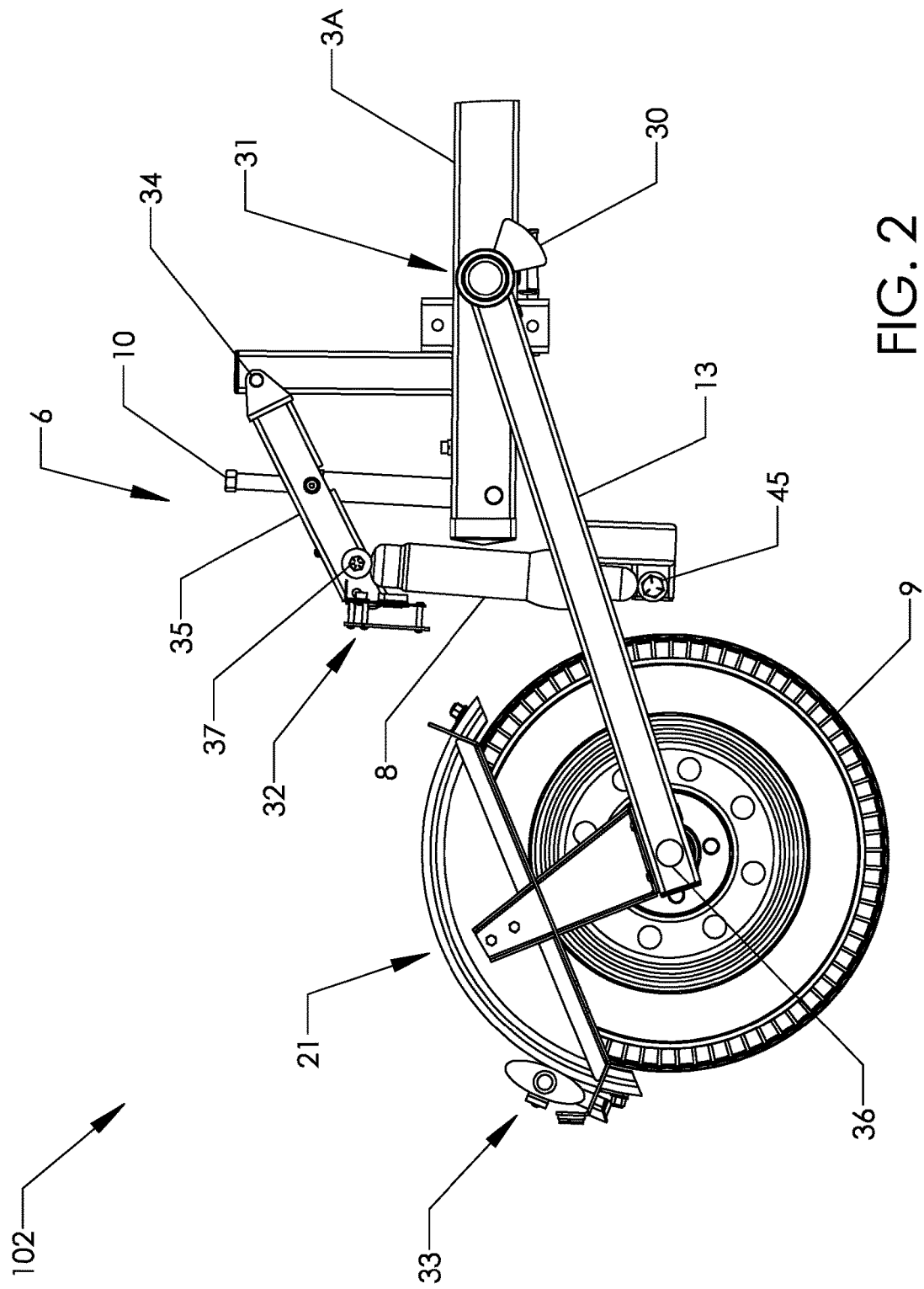
FIG. 2 shows a detail view of the wheel assembly in FIG. 1.
Figure 3:
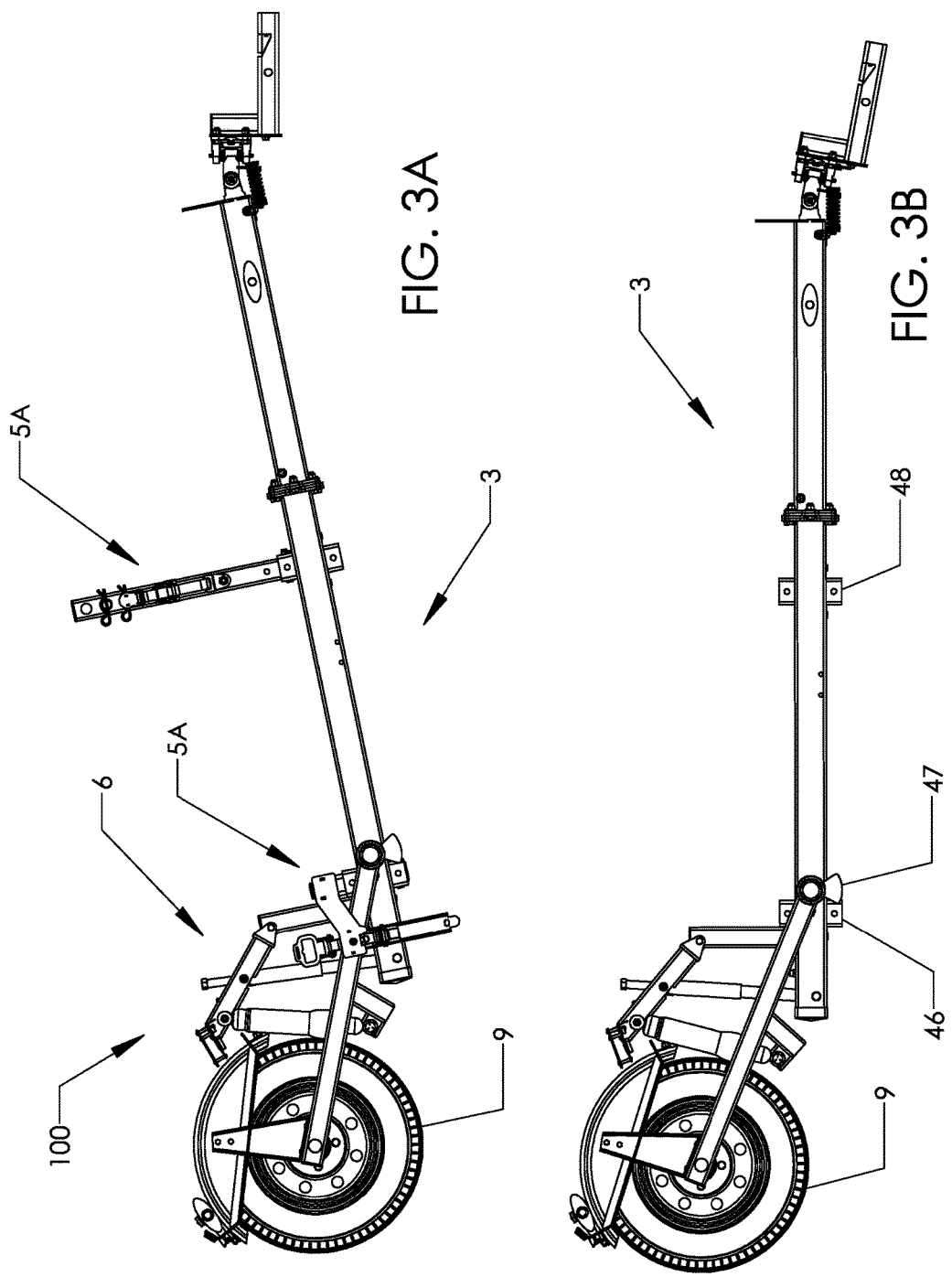
FIG. 3A shows a side view of the trailer system in FIG. 1 in a first configuration.
FIG. 3B shows a side view of the trailer system in FIG. 1 in a second configuration.

As shown in FIG. 2, the wheel assembly 102 can include the lift mechanism 6 for raising and lowering the trailer system 100, the one or more shock absorbers 8, a lighting system 32, one or more reflectors 33, and a stand bracket 30. The stand bracket 30 is arranged to help support the trailer system 100 in a storage configuration as described below. The stand bracket 30 is shown having a wedge shape but can have any suitable shape. In addition, a fender assembly 21 can be mounted on the wheel 9.

The lift mechanism 6 can include an actuator 10 arranged to move the trailer system 100 between a towing configuration (shown in FIG. 1), a loading configuration (shown in FIG. 3A), and a storage configuration (shown in FIGS. 3A and 3B).

To accomplish the raising or lowering of the trailer, the actuator 10 can be extended or retracted relative to the chassis 3. The actuator 10 is shown as a screw or screw-type actuator but can be any suitable type of actuator. When the actuator 10 is extended or retracted it causes a linking member 35 to rotate pivotally about the connection joint 34. As the linking member 35 pivots about the connection joint 34, the opposite end at which point the shock absorbers 8 are pivotally connected at joint 37 swings through an arc and causes the shock absorbers 8 to move up or down relative to the chassis 3. The shock absorbers 8 can be pivotally connected at joint 45 to the swing arm 13.

As the shock absorbers 8 are moved by the linking member 35, the swing arm 13 is caused to pivot about the connection 31. As the swing arm 13 pivots relative to the chassis 3, the chassis 3 is caused to be raised or lowered relative to ground surface on which the wheel 9 stands. Extending the actuator 10 lowers the chassis 3 while retracting the actuator 10 raises the chassis 3. The wheel 9 can rotate on conical bearings around axle 36.

FIGS. 3A and 3B show the trailer system 100 in the loading and storage configurations. For example, the lift mechanism 6 can lower the chassis 3 relative to the wheel 9 when the trailer system 100 is attached to a towing vehicle, moving the trailer system 100 toward the loading configuration as seen in FIG. 3A. In the loading configuration, the wheel is positioned on a support surface (e.g., a floor surface, the ground, a platform, or the like) under the trailer system 100 and the chassis 3 is angled relative to the support surface. For instance, the chassis can be angled downwardly from the towing assembly 2 toward the support surface. This beneficially makes loading of certain cargo onto the trailer more easily accomplished. It also makes the trailer system 100 safer to use because the need to lift cargo onto the trailer system 100 is reduced or eliminated.

With the trailer system 100 detached from a tow vehicle, lowering the chassis 3 relative to the wheel 9 moves the trailer system 100 toward the storage configuration, as shown in FIG. 3B. In the storage configuration, the chassis 3 is allowed to rest on the support surface and can be supported at points 46, 47, and 48 with the wheel slightly elevated off the floor surface. The points of contact 46, 47, 48 with the wheel 9 elevated off the ground results in a stable storage position. While three points of contact are shown, it will be appreciated that two, four, or any other suitable number of points of contact are possible. The motorcycle carrier attachments 5A, 5B are shown in FIG. 3A to demonstrate the advantage of the trailer system's ability to be lowered for loading one or more motorcycles.

Figure 4:
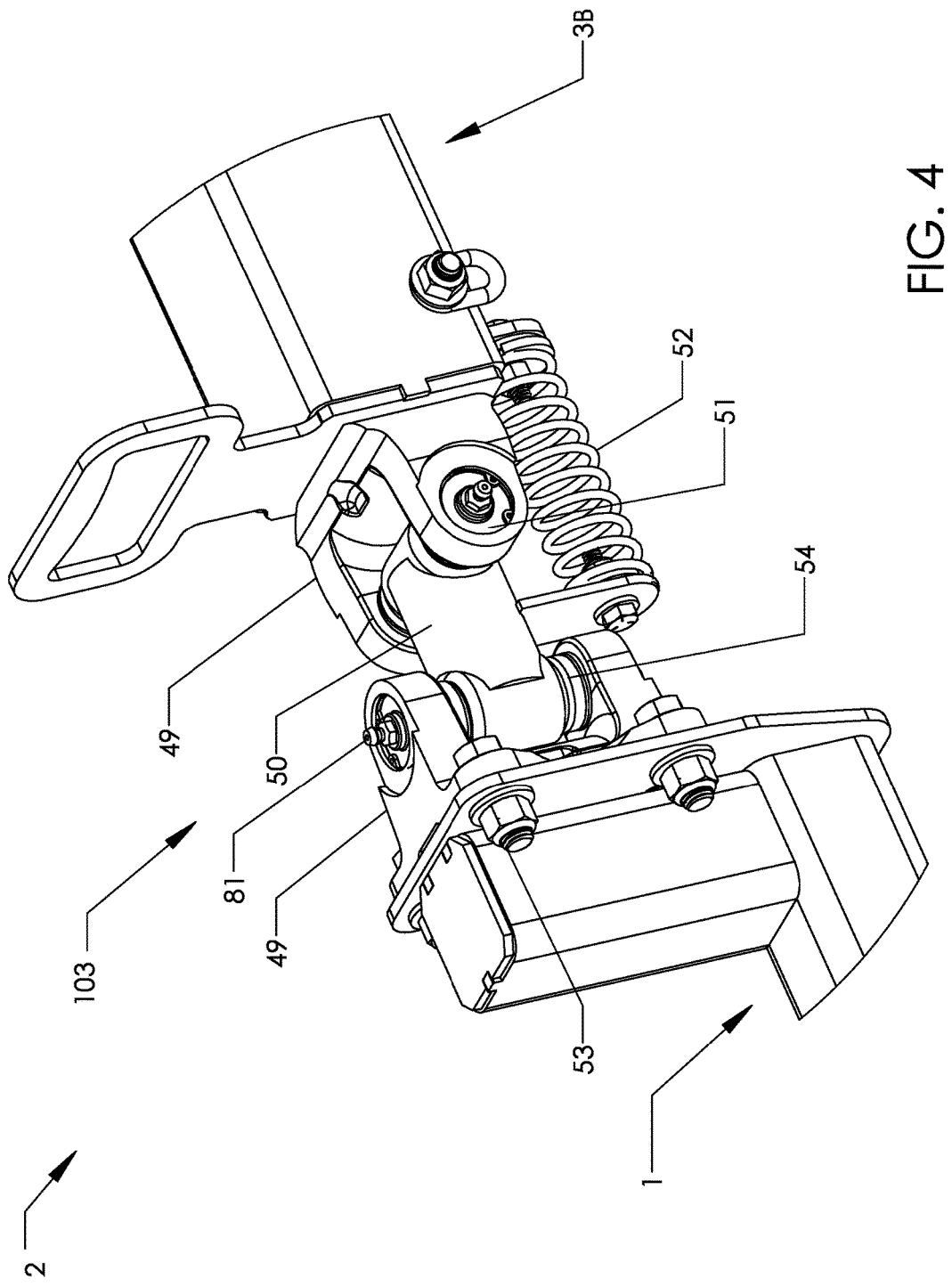
FIG. 4 shows a detail view of the hitch assembly in FIG. 1.

FIG. 4 shows the towing assembly 2 in more detail according to an embodiment. The towing assembly 2 includes an offset dual articulation joint 103 connected to the hitch component 1 and the second section 3B. The offset dual articulation joint 103 is arranged to help maintain the trailer in an upright position by allowing it to pitch and yaw relative to the towing vehicle but not roll.

In the illustrated embodiment, the offset dual articulation joint 103 comprises two yoke members 49, one selectively attached to the hitch component 1 with fasteners 53 and the other attached to the second section 3B. An offset journal cross member 50 is located between and connects the yoke members 49. The offset journal cross member 50 defines axes of rotation a distance apart and extending at substantially 90 degrees from one another. Pins 54 passing through the offset journal cross member 50 rotate within the bearing assemblies 51 which are pressed into the yoke members 49. The bearing assemblies 51 can include a grease fitting 81 for lubrication. A spring member 52 acts as a safety feature to catch the hitch component 1 as it is pulled from the hitch receiver of a towing vehicle to avoid injury to fingers.

Figure 5:
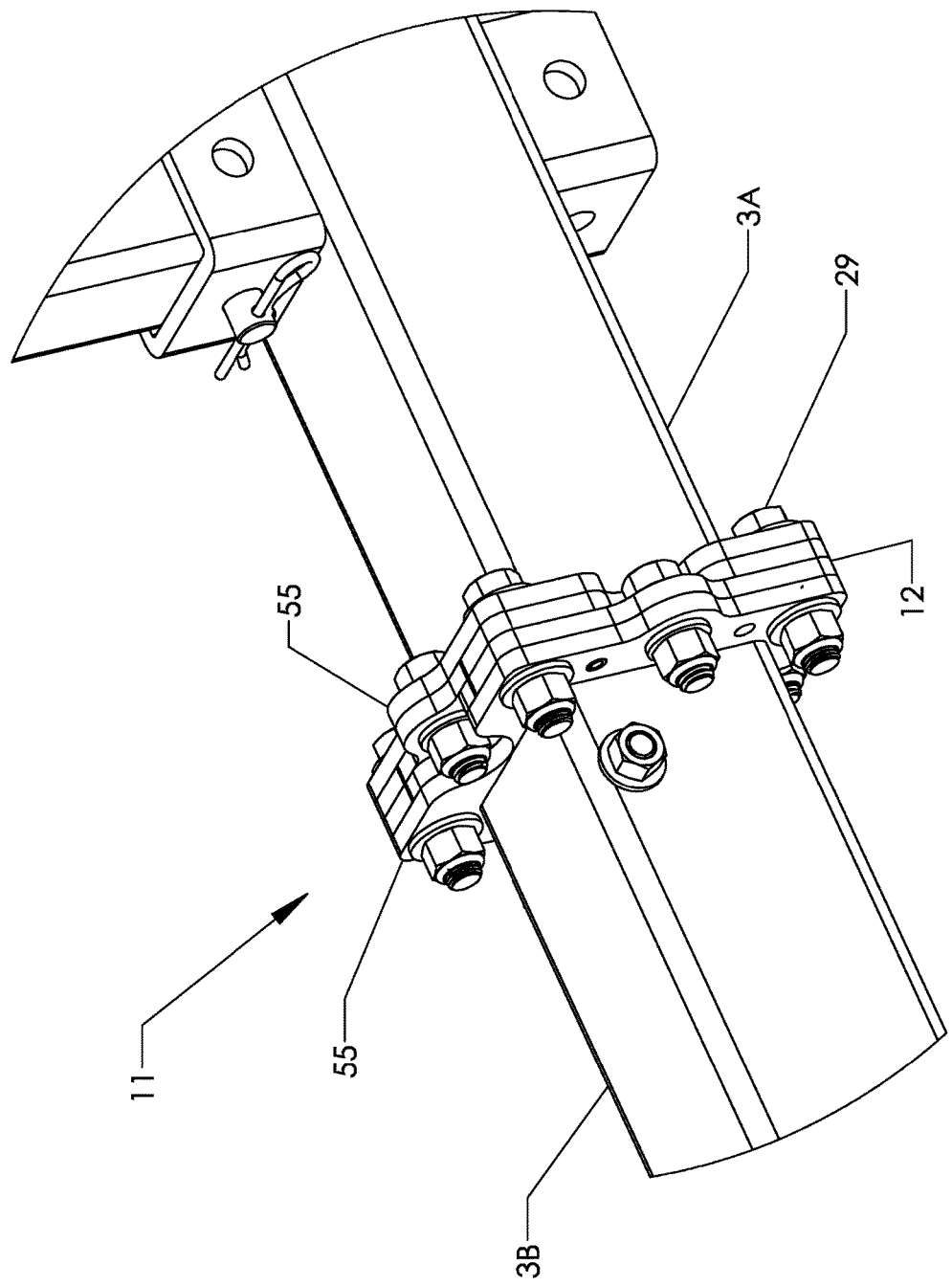
FIG. 5 shows a detail view of the joint assembly in FIG. 1.

FIG. 5 shows a detailed view of the flanged joint 11 according to an embodiment. As described above, the chassis 3 is separable at the flanged joint 11. This beneficially allows for compact storage of the trailer system 100. The flanged joint 11 also can allow for the addition of one or more extension sections or as is depicted in this view, the addition of a twist compensation mechanism 12 or other accessories. As seen, the flanged joint 11 can include at least the sections 3A and 3B, each defining a flange 55 with hole patterns through which fasteners 29 pass to secure the sections 3A and 3B together. Removal of the fasteners 29 allows for the separation of the sections 3A and 3B at the flanged joint 11.

Figure 6:
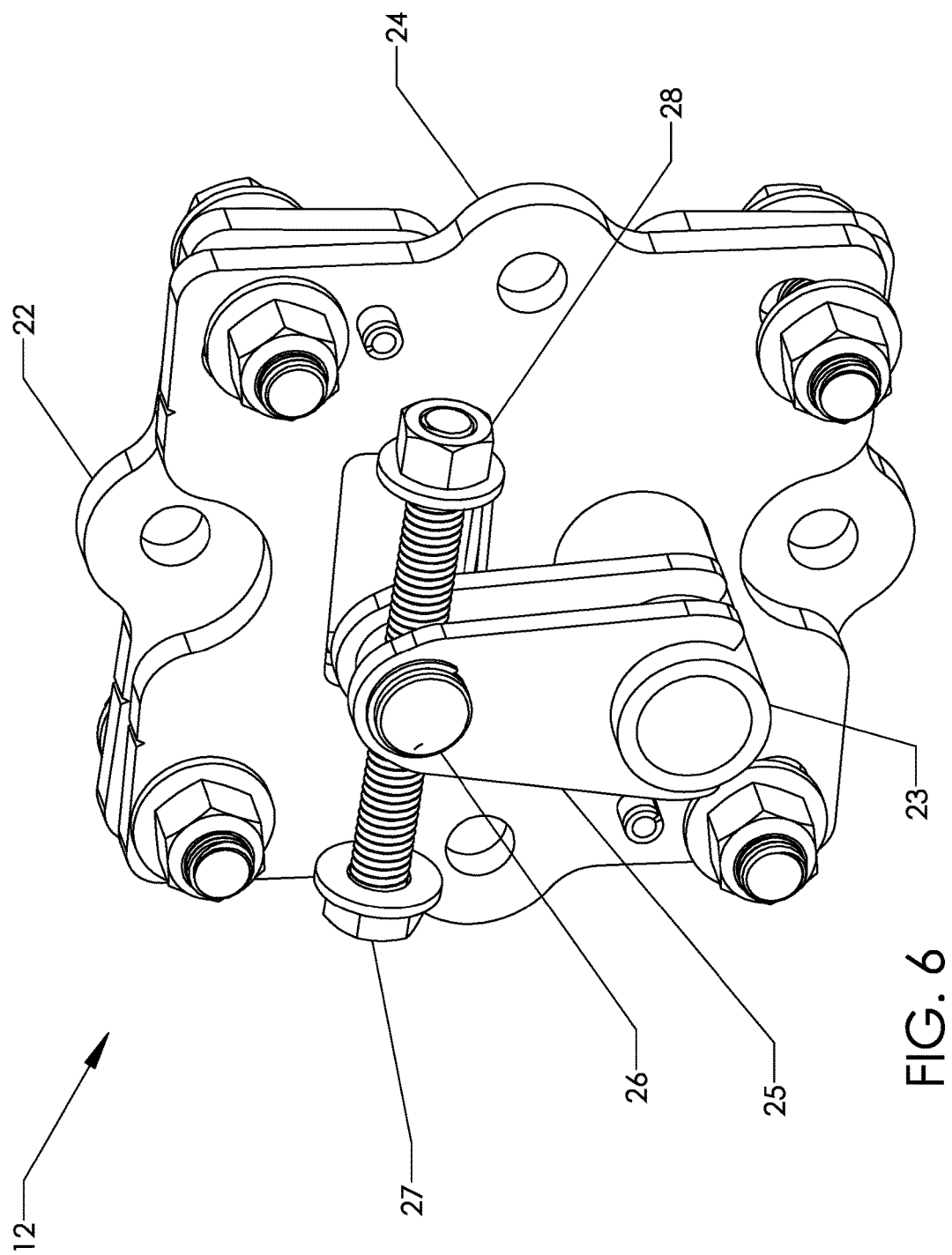
FIG. 6 shows the twist compensation mechanism in FIG. 1 removed from the trailer system for ease of reference.

FIG. 6 shows the twist compensation mechanism 12 according to an embodiment. According to a variation, the twist compensation mechanism 12 can be selectively secured to the chassis 3 at or near the flanged joint 11. For instance, the twist compensation mechanism 12 can be installed in the flanged joint 11 and bolted to the flanges 55 of the first section 3A and/or the second section 3B on either side as depicted in FIG. 5.

The twist compensation mechanism 12 can be any suitable mechanism but is shown including a rotating plate 22, a shaft 23, and a stationary plate 24. In an embodiment, the rotating plate 22 can be attached to the first section 3A and the stationary plate 24 can be attached to the second section 3B or vice versa.

The rotating plate 22 can be rigidly attached to the shaft 23, which passes through a clearance hole defined in the stationary plate 24. Attached to the shaft 23 are levers 25. A cross dowel 26 passes through the levers 25. Passing through the cross dowel 26 is a threaded fastener 27 having a corresponding hex nut 28 which is securely affixed near the end of the threaded fastener 27 with a thread locker to prevent loosening. The threaded fastener 27 extends into the the walls of the second section 3B through clearance holes on either side. When the threaded fastener 27 is turned, it applies a force to the frame walls to create a torsional load in the shaft 23 which in turn rotates the rotating plate 22.

Figure 7:
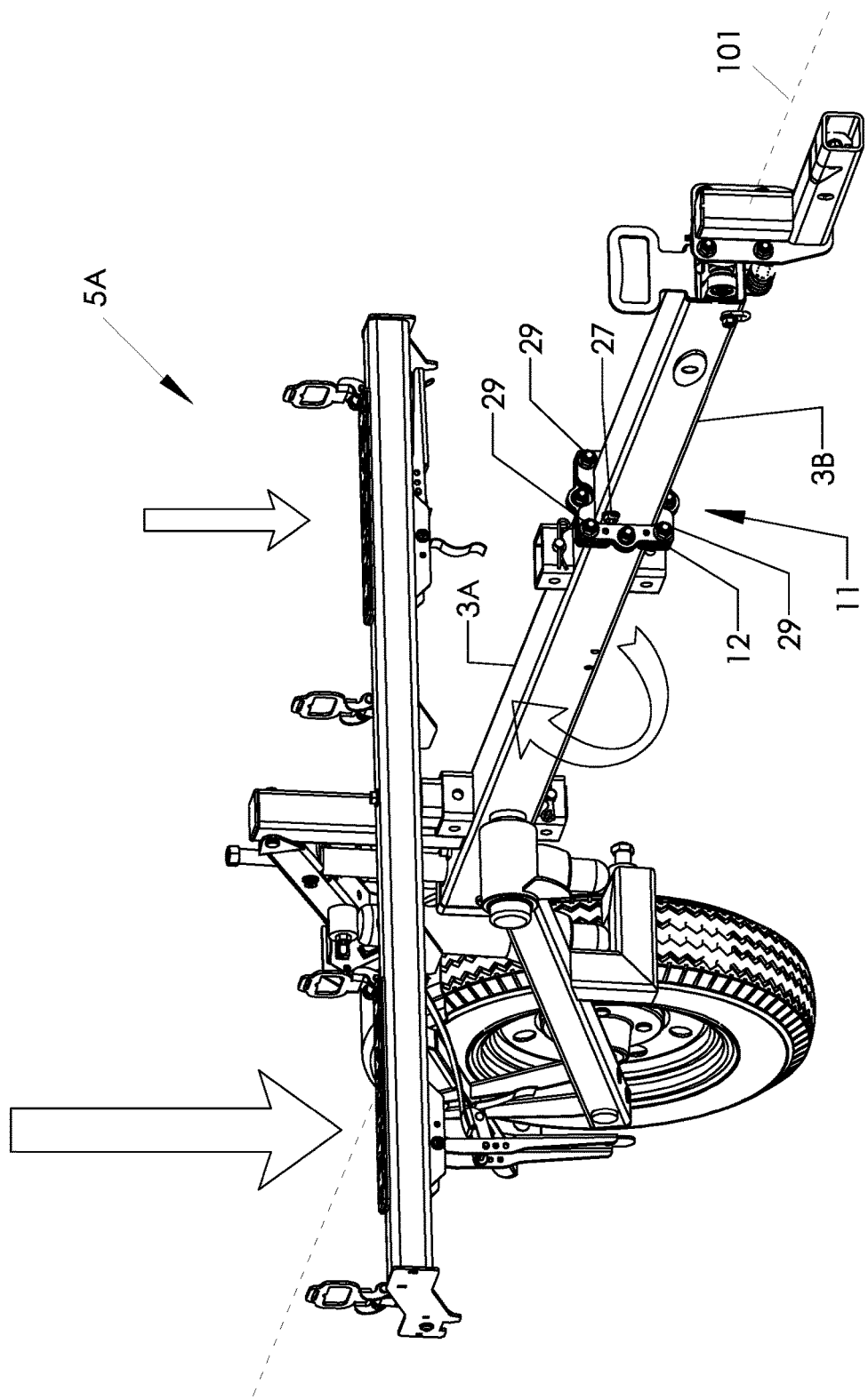
FIG. 7 shows a front isometric view of the trailer system in FIG. 1 in an unbalanced configuration.

Referring to FIG. 7, the twist compensation mechanism 12 is arranged to rotate and maintain the rotational position of at least one of the first and second sections 3A, 3B about the axis 101. This helps the trailer system 100 compensate for torsional twist in the chassis 3 that can result from an unbalanced load being carried by the trailer system 100, which, in turn, can undesirably cause the trailer to lean to one side or another or rotate around the axis 101. For example, if a single motorcycle is loaded on one side of the trailer system 100 and no load or a smaller load is loaded on the other side of the trailer system 100, the motorcycle can create a moment about the axis 101, resulting in a torsional twist within the chassis 3.

The twist compensation mechanism 12 can compensate or counter against such torsional twist by rotating the first section 3A about the axis 101 in the opposite direction of the moment generated by an unbalanced load as seen in FIG. 7. In an embodiment, this is accomplished by determining the approximate amount of compensation required. Then loosening the fasteners 29 that pass through the entire flanged joint 11 allowing for rotational movement. Next, the threaded fastener 27 is turned until the first section 3A is rotated the approximate amount required to compensate for the twist from the unbalanced load. The fasteners 29 are subsequently tightened to lock the twist compensation mechanism 12 in the desired position. It will be appreciated that the steps described above are exemplary only.

Figure 8:
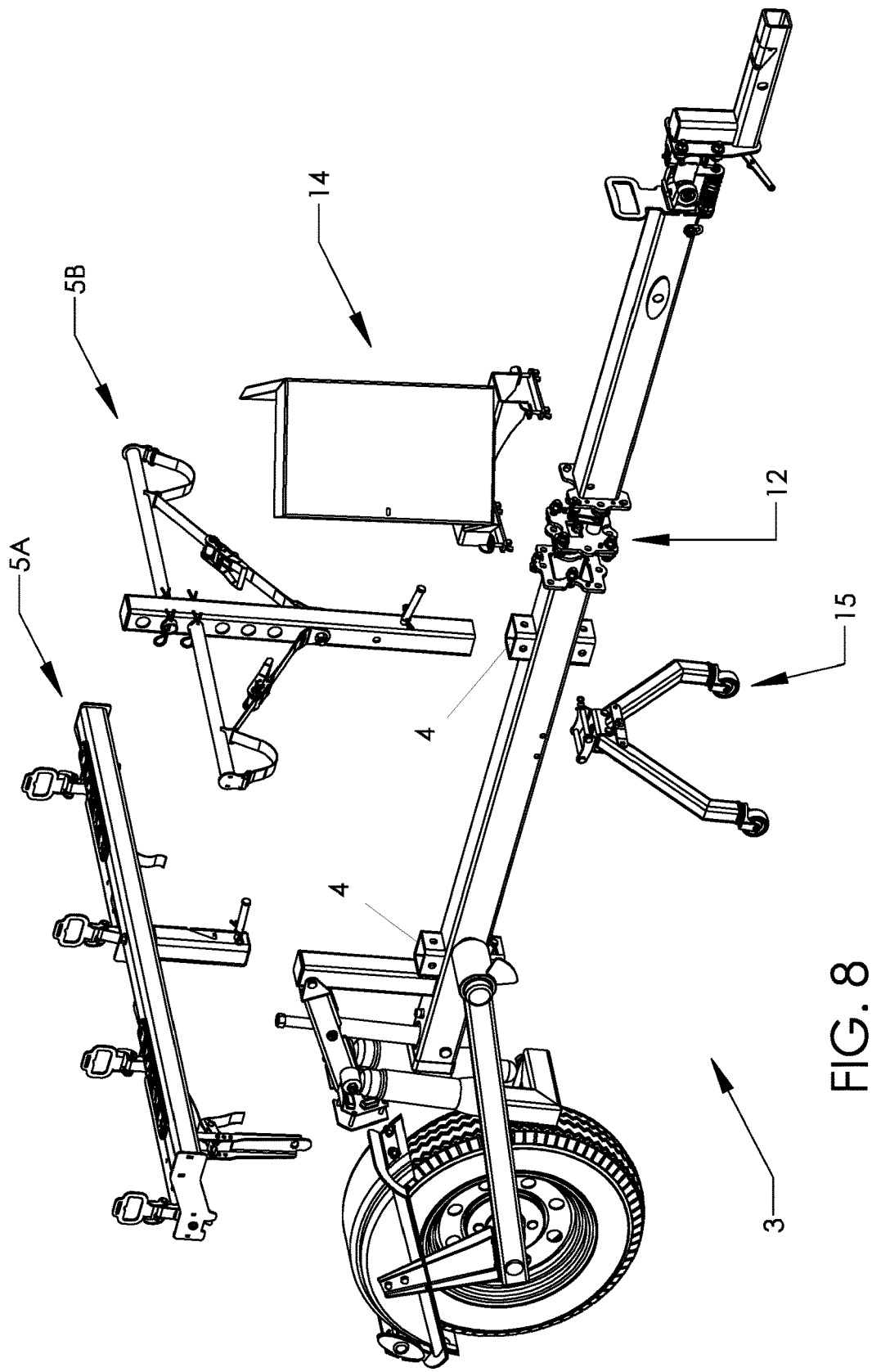
FIG. 8 shows a partial exploded view of the trailer system in FIG. 1.

FIG. 8 is a partial exploded view of the trailer system 100 showing that the accessory attachments (e.g., motorcycle carrier attachments 5A, 5B, twist compensation mechanism 12, container carrier attachment 14, and landing gear assembly 15) can be easily and selectively added to and/or removed from the chassis 3 to reconfigure the trailer system 100 for different applications. For example, the motorcycle carrier attachments 5A, 5B can be removed and replaced with another accessory attachment such as a kayak carrier attachment or bicycle carrier attachment or any of the numerous other possible accessory attachments. FIG. 8 also illustrates some attachment mechanisms by which an accessory attachments may be attached to the chassis 3. For instance, possible attachment mechanisms can include insertion into receiver tubes 4 like the motorcycle carrier attachment 5A, 5B, clamping to the chassis 3 like the container carrier attachment 14, pinning or bolting to the chassis 3 like the landing gear assembly 15, or insertion into the chassis 3 at the flanged joint 11 like the twist compensation mechanism 12. In an embodiment, the container carrier attachment 14 can comprise a fuel jug container carrier.

FIGS. 9A and 9B illustrate the landing gear assembly 15 according to an embodiment. FIG. 9A shows the landing gear assembly 15 in an open configuration and FIG. 9A shows the landing gear assembly 15 in a collapsed configuration. The landing gear assembly 15 can be selectively attached to the chassis 3 to make moving the trailer system 100 around easier and safer when the trailer system 100 is not attached to a tow vehicle. In an embodiment, the landing gear assembly 15 can be arranged to clamp onto the chassis 3. For instance, a mounting bracket 16 can be attached to the chassis 3 via a first plurality of fasters 18 or permanently by welding. To attach the landing gear assembly 15 to the chassis 3, notches 17 defined in legs 20 of the landing gear assembly 15 can be positioned directly below a second plurality of fasteners 19 on the mounting bracket 16. The legs 20 are arranged to spread apart so that the notches 17 engage the second fasteners 19 or the second fasteners 19 are received in the notches 17.

While in use, a load or force of gravity pushing down on the chassis 3 creates a spreading force on the legs 20, helping to maintain a secure connection to the mounting bracket 16. To detach the landing gear assembly 15 from the chassis 3, the legs 20 are simply brought together, which, in turn, releases the grip on the second fasteners 19 of the mounting bracket 16. Then the landing gear assembly 15 can be fully collapsed and stowed until needed again. According to a variation, the landing gear assembly 15 can have a folding A frame design with wheels at or near a bottom end of each leg 20. It will be appreciated that the fasteners 18 and/or fasteners 19 can be pins, threaded members, combinations thereof, or any other suitable fastener.

FIGS. 10A and 10B show the load securing system 38 which can easily and quickly secure a load to the trailer system 100. In an embodiment, the back motorcycle carrier attachment 5A includes a support member 56 extending in a direction across the chassis 3, and a generally upright connecting member 75 attached to the support member 56. The connecting member 75 is sized and configured to secure the back motorcycle carrier attachment 5A to the trailer system 100 via the receiver tube 4. The load securing system 38 can be attached to the support member 56 of the back motorcycle carrier attachment 5A. As seen, the load securing system 38 can include a first and second securing units 38A, 38B on opposite end portions of the support member 56. Each securing unit 38A, 38B can be independently operable. In other embodiments, operation of one of the securing units can be linked to the other. While two securing units are shown, in other embodiments, the load securing system 38 can include one, three, four, or any other suitable number of securing units.

In other embodiments, the load securing system 38 can be included with different attachment accessories. For instance, the load securing system 38 can be included with a flatbed attachment described below. In other embodiments, the load securing system 38 can be used alone or separate from the trailer system.

In the illustrated embodiment, FIG. 10A shows the load securing system 38 with both securing units 38A, 38B in the open and released position. FIG. 10B shows the load securing system 38 with both securing units 38A, 38B in the closed and locked position. It will be appreciated that one securing unit can be in the closed and locked position while the other securing unit can be in the open and released position.

Figure 11:
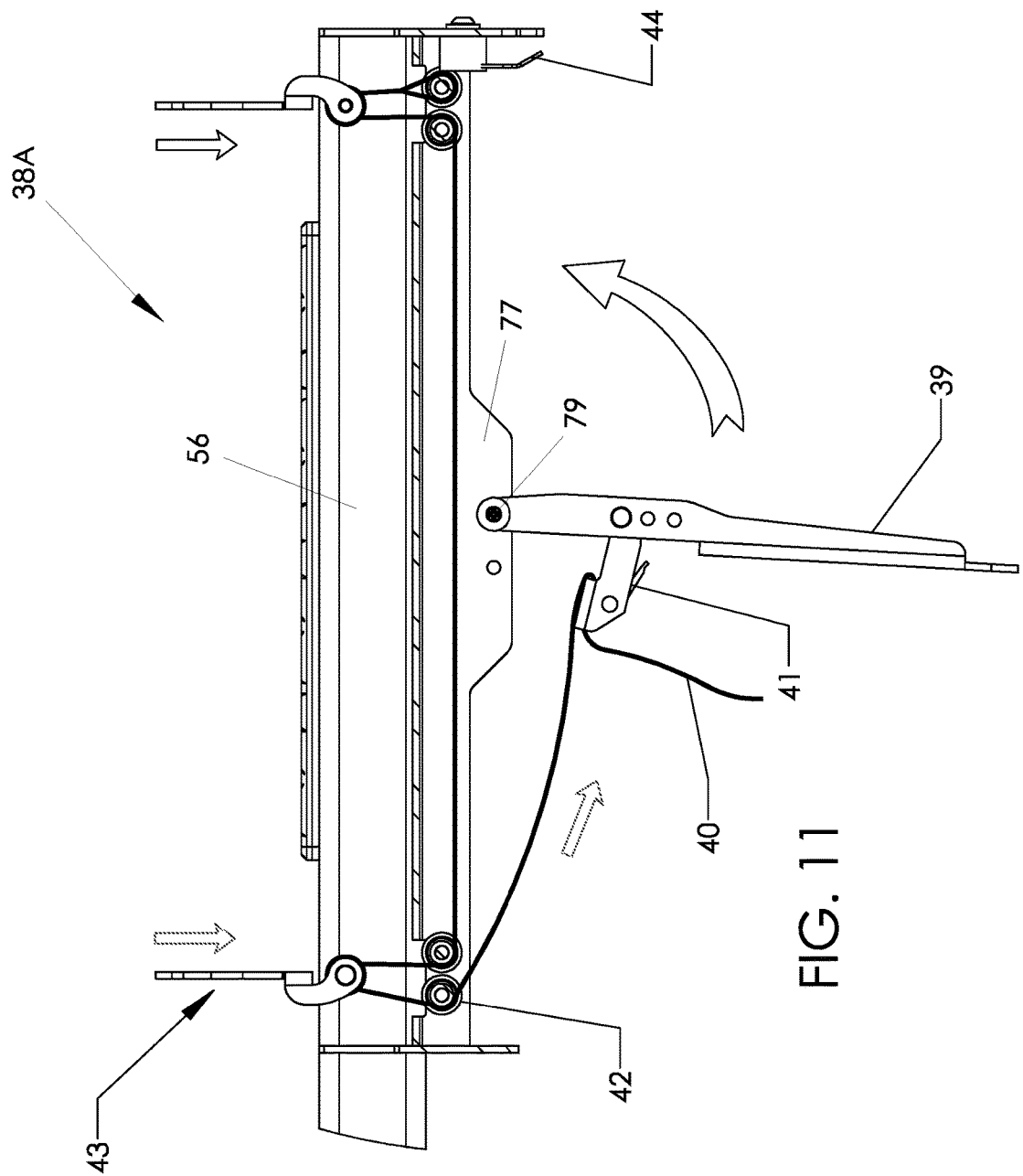
FIG. 11 shows a detail view of the securing system in FIG. 1.
Figure 12:
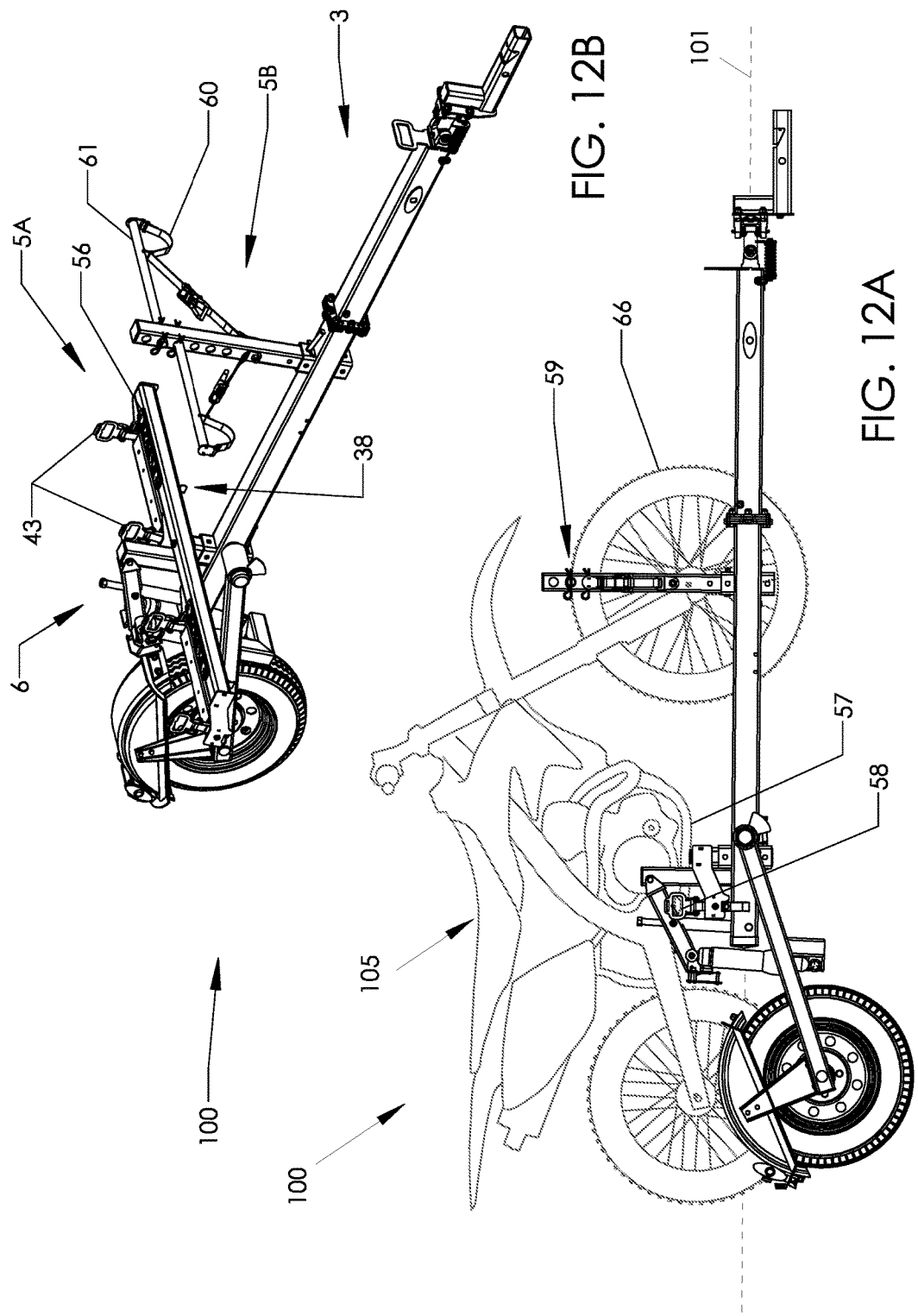
FIG. 12A shows the trailer system in FIG. 1 carrying a motorcycle according to an embodiment.
FIG. 12B shows an isometric view of the trailer system in FIG. 12 without the motorcycle.

FIG. 11 shows one of the securing units of the load securing system 38 in more detail. In an embodiment, securing unit 38A, for example, can comprise a bottom bracket 77, a lever 39 pivotally connected to the bottom bracket 77 at a connection point 79, a tightening member 40, a cam buckle 41, a series of pulleys 42 located on the support member 56 and/or bottom bracket 77, and one or more pulley brackets 43 connected to the support member 56. The tightening member 40 can be a strap member, a length of chain, rope, or any other suitable tightening member. The pulley brackets 43 may include a hook or loop part and/or other attachment mechanism for attaching to a load and a safety latch 44. In other embodiments, the bottom bracket 77 can be omitted. For instance, the lever 39 and/or pulleys 42 can be connected to directly to the support member 56.

To use the load securing system 38 to secure a load, the lever 39 of at least one of the securing units 38A, 38B is held in the open position while excess slack in the tightening member 40 is pulled through the cam buckle 41. The lever 39 is then pivoted to the closed position as illustrated by the rotation arrow where it engages the safety latch 44, which advantageously helps prevent the unintentional release of the lever 39.

As the lever 39 is moved to the closed position it pulls tension on the tightening member 40 which serpentines through the series of pulleys 42 and in turn pulls tension on the pulley brackets 43 as shown by the motion arrows. The load is thus quickly and easily secured to a support such as the support member 56 of the back motorcycle carrier attachment 5A and/or cinched by the tension force from the pulley brackets 43.

FIG. 12A shows a motorcycle 105 positioned and secured on the trailer system 100 for transport according to an embodiment. FIG. 12B shows the trailer system 100 with the motorcycle 105 removed for ease of reference. With the back and front motorcycle carrier attachments 5A and 5B secured to the chassis 3 and the trailer system 100 in the lowered position (e.g., loading configuration), the motorcycle 105 can be positioned on the trailer system 100 such that the support member 56 of the back motorcycle carrier attachment 5A is located below the motorcycle frame 57 and the foot pegs 58 are positioned substantially directly above the pulley brackets 43.

The lift mechanism 6 can then be operated to raise the chassis 3 until the motorcycle attachment support member 56 makes contact with the frame 57 of the motorcycle. The pulley brackets 43 are then hooked over the foot pegs 58 of the motorcycle and the lever cinching system 38 is used to secure the motorcycle to the back motorcycle attachment 5A.

The front wheel 66 of the motorcycle is secured to a cross support 61 of the front motorcycle carrier attachment 5B where a strap 60 passes through the front wheel at point 59 and when tightened, the wheel is cinched to the support member 61 where it is securely clamped in place.

Figure 13:
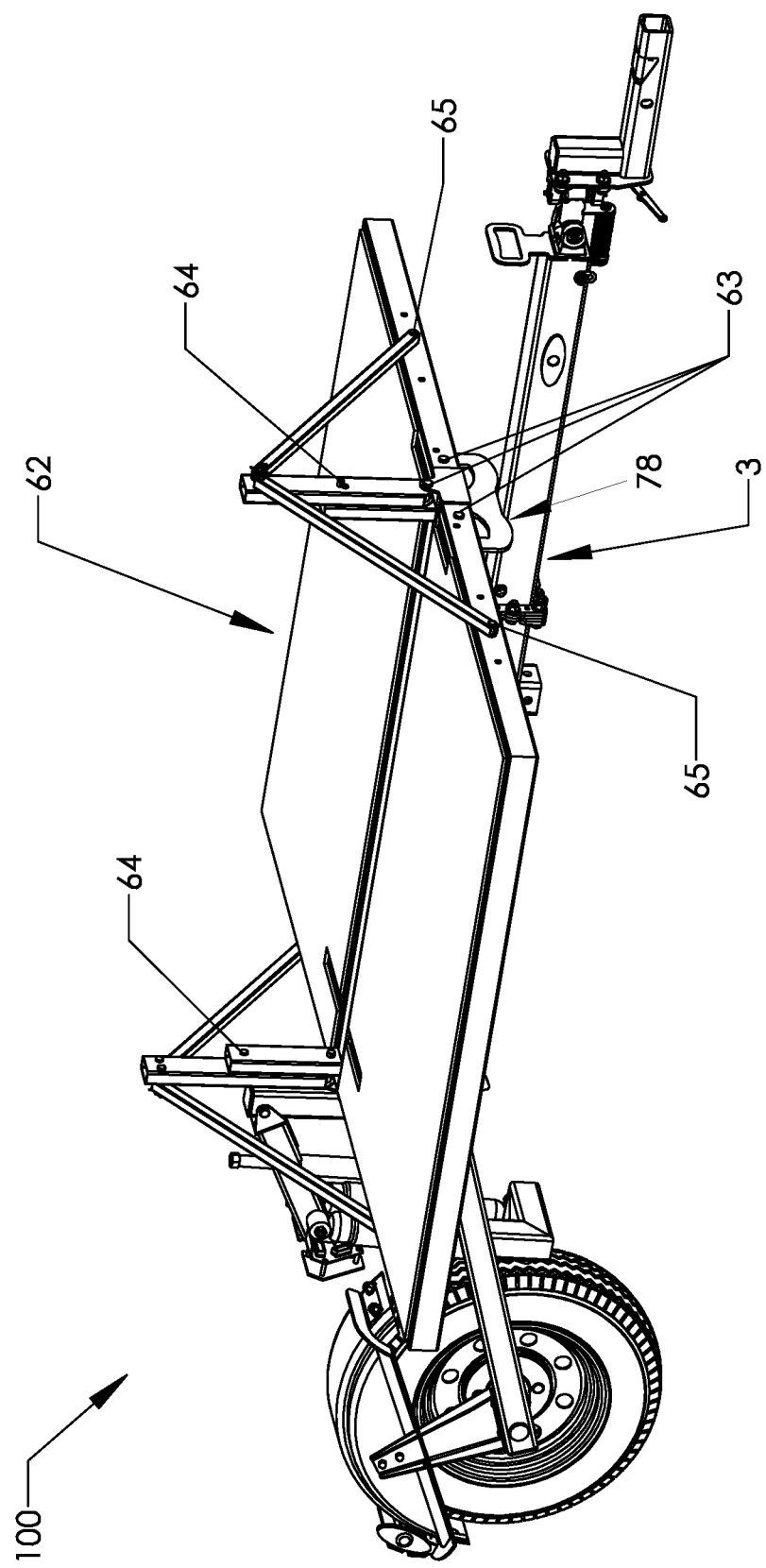
FIG. 13 shows a trailer system according to another embodiment.

FIG. 13 shows another embodiment of the present disclosure in which the trailer system 100 is configured as a flatbed trailer. For instance, a flatbed attachment 62 can be secured to the chassis 3 that is configured as an accessory attachment or add-on module that can be removably secured to the chassis 3 via one or more of the receiver tubes 4. In another embodiment, the flatbed attachment 62 can be permanently secured to the chassis 3.

According to a variation, the flatbed attachment 62 can be arranged for side dumping or rotating around a connection 78 between the flatbed attachment 62 and the chassis 3. In an embodiment, the connection 78 can include a first set of fasteners 63 about which the flatbed attachment 62 can pivot when one or more of a second set of fasteners 64 is removed from the flatbed attachment 62 which allows the bed to tip to one side or the other for dumping or for use as a loading ramp.

With the flatbed attachment 62 secured to or installed in the chassis 3, the trailer 100 can be used to transport various non-specific cargo such as green waste, yard care equipment, firewood, furniture, and etc. When not in use, the side dumping flatbed attachment can be folded by removing a third set of fasteners 65 which allows for minimal storage space requirements. The fasteners 63, 64, and/or 65 can be pins or pin members, threaded fasteners, combinations thereof, or any other suitable type of fastener.

While various aspects and embodiments have been disclosed herein, other aspects and embodiments are contemplated. The various aspects and embodiments disclosed herein are for purposes of illustration and are not intended to be limiting. For instance, while the trailer system is described as including a single wheel, in other embodiments, the trailer system can include two, three, four, or any other number of suitable wheels. Furthermore, while the trailer system is shown and described including a single chassis, in other embodiments, the trailer system may be configured so that two, three, or any suitable number of chassis can be yoked or connected together. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A trailer system comprising:
a chassis defining a longitudinal axis and including a first section and a second section removably attached to the first section;
a wheel assembly attached to the first section of the chassis, the wheel assembly including a single wheel and a lift mechanism arranged to raise and lower the chassis relative to the single wheel; and
a twist compensation mechanism attached to the chassis and arranged to selectively rotate at least one of the first section and second section about the longitudinal axis.

2. The trailer system of claim 1, wherein the lift mechanism is arranged to move the trailer system into a storage configuration in which the chassis is positioned on a support surface below the trailer system and the single wheel is elevated a distance above the support surface.

3. The trailer system of claim 1, wherein the lift mechanism is arranged to move the trailer system into a loading configuration in which the single wheel is positioned on a support surface under the trailer system and the chassis is angled relative to the support surface to facilitate loading.

4. The trailer system of claim 3, wherein the lift mechanism is arranged to move the trailer system between the loading configuration and a towing configuration in which the chassis is elevated a distance above the support surface and extends generally parallel to the support surface.

5. The trailer system of claim 3, further comprising a towing apparatus including a hitch component and an offset dual articulation joint connecting the hitch component to the second section, the offset dual articulation joint arranged to allow the second section to pitch and yaw relative to the hitch component when the trailer system is in the towing configuration.

6. The trailer system of claim 1, wherein the lift mechanism is an actuator that extends and retracts to raise and lower the chassis relative to the single wheel.

7. The trailer system of claim 1, wherein the twist compensation mechanism is arranged to compensate for torsional twist in the chassis caused by an unbalanced load applied to the chassis.

8. The trailer system of claim 1, wherein the twist compensation mechanism includes a rotating plate attached to the first section and a stationary plate attached to the second section.

9. The trailer system of claim 8, further comprising a shaft rigidly attached to the rotating plate.

10. The trailer system of claim 1, wherein at least one of the first section and the second section defines at least one receiver tube arranged to receive one or more accessory attachments.

11. The trailer system of claim 10, wherein the one or more accessory attachments includes a motorcycle carrier attachment including a support member extending in a direction across the chassis and a connecting member attached to the support member, the connecting member being sized and configured for insertion into the at least one receiver tube.

12. The trailer system of claim 11, wherein a load securing system is attached to the support member of the motorcycle carrier attachment, the load securing system including a tightening member and a pivoting lever arranged to pull tension on the tightening member.

13. The trailer system of claim 10, wherein the one or more accessory attachments includes a flatbed attachment arranged for side dumping.

14. The trailer system of claim 1, wherein the wheel assembly includes a swing arm suspension assembly attached to the single wheel and one or more shock absorbers arranged to dampen movement of the swing arm suspension assembly.

15. The trailer system of claim 1, wherein the first section is removably attached to the second section at a flanged joint.

16. The trailer system of claim 1, wherein one or more extension sections are arranged for attachment to the chassis at the flanged joint.

17. A trailer system comprising:
a chassis including a first section and a second section removably attached to the first section at a flanged joint;
a wheel assembly attached to a back portion of the first section, the wheel assembly including a single wheel and a lift mechanism arranged to raise and lower the chassis relative to the single wheel;
a towing assembly attached to a front portion of the second section, the towing assembly including a hitch component and an offset dual articulation joint connecting the hitch component to the second section; and
a twist compensation mechanism attached to the chassis and arranged to rotate at least one of the first section and second section relative to the other.

18. The trailer system of claim 17, wherein at least one of the first section and the second section defines at least one receiver tube arranged to receive and secure one or more accessory attachments therein.

19. A trailer system comprising:
a chassis comprising a tubular member including a first section and a second section removably attached to the first section, at least one of the first section and the second section defining at least one receiver tube;
a twist compensation mechanism attached to the chassis and arranged to rotate at least one of the first section and second section relative to the other;
a wheel assembly attached to a back portion of the first section, the wheel assembly including a single wheel and a lift mechanism arranged to raise and lower the chassis relative to the single wheel;
a towing assembly attached to a front portion of the second section, the towing assembly including a hitch component and an offset dual articulation joint connecting the hitch component to the second section; and
one or more accessory attachments removably attachable to the chassis via the at least one receiver tube.

20. The trailer system of claim 19, wherein the one or more accessory attachments includes a motorcycle carrier attachment comprising a support member extending in a direction across the chassis and a connecting member attached to the support member, the connecting member being sized and configured for insertion into the at least one receiver tube.

* * * * *